United States Patent
Yuan

(10) Patent No.: US 10,372,119 B2
(45) Date of Patent: Aug. 6, 2019

(54) METHOD FOR REMOTE MONITORING, AND SYSTEM FOR SIGNAL CAPTURING AND REMOTE MONITORING

(71) Applicant: Alibaba Group Holding Limited, Grand Cayman (KY)

(72) Inventor: Zhijun Yuan, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 489 days.

(21) Appl. No.: 14/554,461

(22) Filed: Nov. 26, 2014

(65) Prior Publication Data
US 2015/0153731 A1    Jun. 4, 2015

(30) Foreign Application Priority Data
Nov. 29, 2013    (CN) .......................... 2013 1 0629535

(51) Int. Cl.
| | | |
|---|---|---|
| G06F 11/00 | (2006.01) | |
| G05B 23/00 | (2006.01) | |
| H04N 7/18 | (2006.01) | |
| G05B 23/02 | (2006.01) | |

(52) U.S. Cl.
CPC ............... *G05B 23/00* (2013.01); *H04N 7/18* (2013.01); *G05B 23/0213* (2013.01)

(58) Field of Classification Search
CPC ....... G05B 23/00; G05B 23/0213; H04N 7/18
USPC ....................................................... 702/188
See application file for complete search history.

(56) References Cited

U.S. PATENT DOCUMENTS

| | | | |
|---|---|---|---|
| 2005/0179539 A1* | 8/2005 | Hill | .................. G08B 13/19632 340/539.1 |
| 2007/0195800 A1* | 8/2007 | Yang | ................. H04L 29/12066 370/401 |
| 2011/0007159 A1 | 1/2011 | Camp et al. | |
| 2011/0058034 A1 | 3/2011 | Grass | |
| 2012/0307070 A1 | 12/2012 | Pierce | |
| 2013/0107029 A1 | 5/2013 | Knasel et al. | |

(Continued)

FOREIGN PATENT DOCUMENTS

| | | |
|---|---|---|
| CN | 102609628 A | 7/2012 |
| CN | 102833527 A | 12/2012 |

(Continued)

OTHER PUBLICATIONS

Dutton, "Getting Started with WebRTC", retrieved on Feb. 21, 2014 at <<http://www.html5rocks.com/en/tutorials/webrtc/basics>>, Jul. 23, 2012, 32 pages.

(Continued)

*Primary Examiner* — Huan Hoang
(74) *Attorney, Agent, or Firm* — Lee & Hayes, P.C.

(57) ABSTRACT

A method and an apparatus for remote monitoring. A signal capturing device running a Web operating system captures an audio signal and/or a video signal, and transmits the captured signal to a remote monitoring device via a communication link between the signal capturing device and the remote monitoring device. The remote monitoring device also supports the Web operating system to allow the communication link to be established using WebRTC technology. The audio and/or video unit of the signal capturing device is accessed through a MediaStream port.

9 Claims, 6 Drawing Sheets

(56) References Cited

U.S. PATENT DOCUMENTS

| | | | |
|---|---|---|---|
| 2013/0117270 A1 | 5/2013 | Sullivan et al. | |
| 2013/0261774 A1 | 10/2013 | Lu et al. | |
| 2013/0328997 A1* | 12/2013 | Desai | H04N 7/141 348/14.02 |
| 2014/0172957 A1 | 6/2014 | Baum et al. | |
| 2014/0173304 A1* | 6/2014 | Rahman | H04L 12/6418 713/310 |
| 2014/0293046 A1 | 10/2014 | Ni | |
| 2015/0009048 A1 | 1/2015 | Wang et al. | |
| 2016/0134835 A1* | 5/2016 | Desai | H04N 7/141 348/14.02 |
| 2016/0337852 A1* | 11/2016 | Timariu | H04L 63/168 |
| 2017/0052969 A1* | 2/2017 | Carriero | G06F 17/3089 |

FOREIGN PATENT DOCUMENTS

| | | |
|---|---|---|
| CN | 103404132 A | 11/2013 |
| CN | 103414835 A | 11/2013 |
| JP | 2000059762 A | 2/2000 |
| JP | 2003219400 A | 7/2003 |

OTHER PUBLICATIONS

Kamailio World, "WebRTC & Future Communications", retrieved on Feb. 6, 2015 at <<http://www.kamailio.org/events/2013-KamailioWorld/17-Dean.Bubley-WebRTC-and-Future-Communications.pdf>>, Disruptive Analysis, Apr. 17, 2013, 24 pages.

PCT Search Report and Written Opinion dated Feb. 17, 2015 for PCT Application No. PCT/US14/67606, 10 Pages.

Chinese Search Report for Chinese Application No. 2013106295350, dated Apr. 24, 2017, 2 pages.

Hongtao, "A Design of Real-Time Visible Interphone Based on the SIP and WebRTC," China Master's Theses Full-text Database Information Technology Collection, Issue 11, Nov. 15, 2013, 80 pages.

Zhenhua et al., "Key Technologies and Strategies Analysis of WebRTC for Telecom Operator," Telecommunications Science, Aug. 20, 2013.

Machine translation of the first Chinese Office Action dated May 3, 2017 for Chinese patent application No. 201310629535.0, a foreign counterpart application of U.S. Appl. No. 14/554,461, 10 pages.

Machine translation of the third Chinese Office Action dated May 8, 2018 for Chinese patent application No. 201310629535.0, a foreign counterpart application of U.S. Appl. No. 14/554,461, 8 pages.

Grigorik, "High Performance Browser Networking," retrieved at <<http://met.guc.edu.eg/Download.ashx?id=25985&file=High-Performance-Browser-Networking-Ilya-Grigorik_25985.pdf>>, Chapter 18, WebRTC, Sep. 9, 2013, pp. 309-362.

Japanese Office Action dated Dec. 11, 2018 for Japanese Patent Application No. 2016-525080, a counterpart of U.S. Appl. No. 14/554,461, 9 pages.

Japanese Office Action dated Mar. 26, 2019 for Japanese Patent Application No. 2016-525080, a counterpart of U.S. Appl. No. 14/554,461, 9 pages.

Sawada, "New Trend of Web Platform, Second Article on In-vehicle Platform Series, Car Telematics (second part), Achieving Various Applications with Browsers: the key is to use WebSocket and WebRTC," Nikkei Communications, No. 599, Nikkei Business Publications Inc, Nov. 28, 2013, pp. 60-63.

* cited by examiner

METHOD FOR REMOTE MONITORING, AND SYSTEM FOR SIGNAL CAPTURING AND REMOTE MONITORING

RELATED PATENT APPLICATIONS

This application claims foreign priority to Chinese Patent Application No. 201310629535.0 filed on Nov. 29, 2013, entitled "METHOD FOR REMOTE MONITORING, AND SYSTEM FOR SIGNAL CAPTURING AND REMOTE MONITORING," Chinese Patent Application is hereby incorporated by reference in its entirety.

TECHNICAL FIELD

The present application relates to Internet technologies, and more specifically relates to methods for remote monitoring, signal capturing devices and remote monitoring systems.

BACKGROUND

There are needs for remote monitoring or remote detection in various consumer and industrial fields. Currently, there are primarily two types of remote monitoring. The first method involves using a specialized audio and video capture device, such as a voice recognition device and a video camera, to capture audio and video signals, transmit the collected signals through a proprietary link to a monitoring device, such as a personal computer, and use the monitoring device to further process the received signals. The second method involves using a conventional mobile device (excluding mobile devices with a Web operating system) for remote monitoring. The second method uses conventional mobile devices' video and audio input capability to capture audio and video signals, and separately transmits the captured signals to another monitoring device such as a personal computer over a network, and then processes the received signals by a monitoring device.

However, the above-described methods have shortcomings. Remote monitoring using specialized audio and video equipment requiring the user to purchase and configure special audio and video equipment, which is resource consuming and costly, and therefore not conducive to universal remote monitoring applications. Similarly, using a conventional mobile device for remote monitoring requires application developments on the conventional mobile device that are compatible with the unique technologies of the conventional mobile device in order to implement the business logic of remote monitoring, and also requires special monitoring equipment (a receiver) that are compatible with the conventional mobile device. As a result, the method is only applicable to special applications developed for the monitoring or detection of specific scenes. The prior art methods involve high level technical difficulties in product development, and offer no simple method to extend and expand the scope of application scenarios.

Therefore, there is a need for a method that has a lower application threshold, particularly one that is possible with the use of existing audio and video capture capabilities of the available devices, in order to avoid the high costs, high degree of technical difficulties and other issues in the prior art.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter.

One aspect of the disclosure is a method for remote monitoring. The method uses a signal capturing device running a Web operating system to capture an audio signal and/or a video signal, and transmits the captured signal to a remote monitoring device via a communication link between the signal capturing device and the remote monitoring device. The remote monitoring device also supports the Web operating system. The communication link is established using WebRTC technology.

One embodiment of the disclosed method uses the signal capturing device to receive an operation command from the remote monitoring device, and perform an operation according to the operation command.

To capture the audio signal and/or the video signal, one embodiment of the method accesses an audio unit or a video unit of the signal capturing device through a MediaStream port of the signal capturing device. Another embodiment establishes a peer to peer connection with the remote monitoring device through an RTCPeerConnection interface, and transmits the audio signal and/or the video signal to the remote monitoring device through an RTCDataChannel interface.

According to another embodiment of the method for remote monitoring, a communication link between the signal capturing device and the remote monitoring device is established using WebRTC technology to allow the remote monitoring device receive the audio signal and/or the video signal from the signal capturing device. The signal capturing device and the remote monitoring device both run a Web operating system. The remote monitoring device processes the audio and/or video signal for remote monitoring. The remote monitoring device may send to a user a feedback of a remote monitoring result obtained after processing the audio signal and/or video signal. The feedback may be in the form of a text message or an email to the user. The feedback may be displayed in a web browser.

Another aspect of the disclosure is an apparatus for signal capturing. The apparatus has a computing device having a processor, computer-readable memory and storage medium, and I/O devices, where the computing device runs a Web operating system and is programmed to have functional modules including a signal capturing module for capturing an audio signal and/or a video signal and a signal transmission module for transmitting the audio signal and/or the video signal to a remote monitoring device via a communication link between the signal capturing module and the remote monitoring device. The remote monitoring device supports the Web operating system, and the communication link is established using WebRTC technology.

The computing device may be further programmed to perform acts such as receiving an operation command from the remote monitoring device and executing the operation according to the operation command. The signal capturing module may have a MediaStream port, and be further programmed to access an audio unit or a video unit of the signal capturing module through the MediaStream port. In one embodiment, the signal transmission module has an RTCPeerConnection interface, and is further programmed to establish a peer to peer connection with the remote monitoring device through the RTCPeerConnection interface. Further, the signal transmission module may have an RTCDataChannel interface, and is programmed to transmit the audio signal and/or the video signal to the remote monitoring device through the RTCDataChannel interface. The audio unit or the video unit of signal capturing module may be a microphone and/or a camera.

Yet another aspect of disclosure is a remote monitoring system, which includes a computing device having a processor, computer-readable memory and storage medium, and I/O devices, where the computing device runs a Web operating system and is programmed to have functional modules including a signal receiving module for receiving an audio signal and/or a video signal through a WebRTC communication link between a signal capturing device and the signal receiving module, and a signal processing module for processing the audio and/or video signal for remote monitoring. The computing device may be programmed to send to a user a feedback of a remote monitoring result obtained after processing the audio signal and/or video signal. In one embodiment, the feedback of the remote monitoring result is sent to the user to be displayed in a web browser. The computing device of the remote monitoring system may be programmed to send an operation command to the signal capturing device.

Other features of the present disclosure and advantages will be set forth in the following description, and in part will become apparent from the description, or understood by practice of the application. Purposes of this application and other advantages can be obtained by the written description, claims, and drawings of the structure particularly pointed out realized and attained.

DETAILED DESCRIPTION

Figure 1:
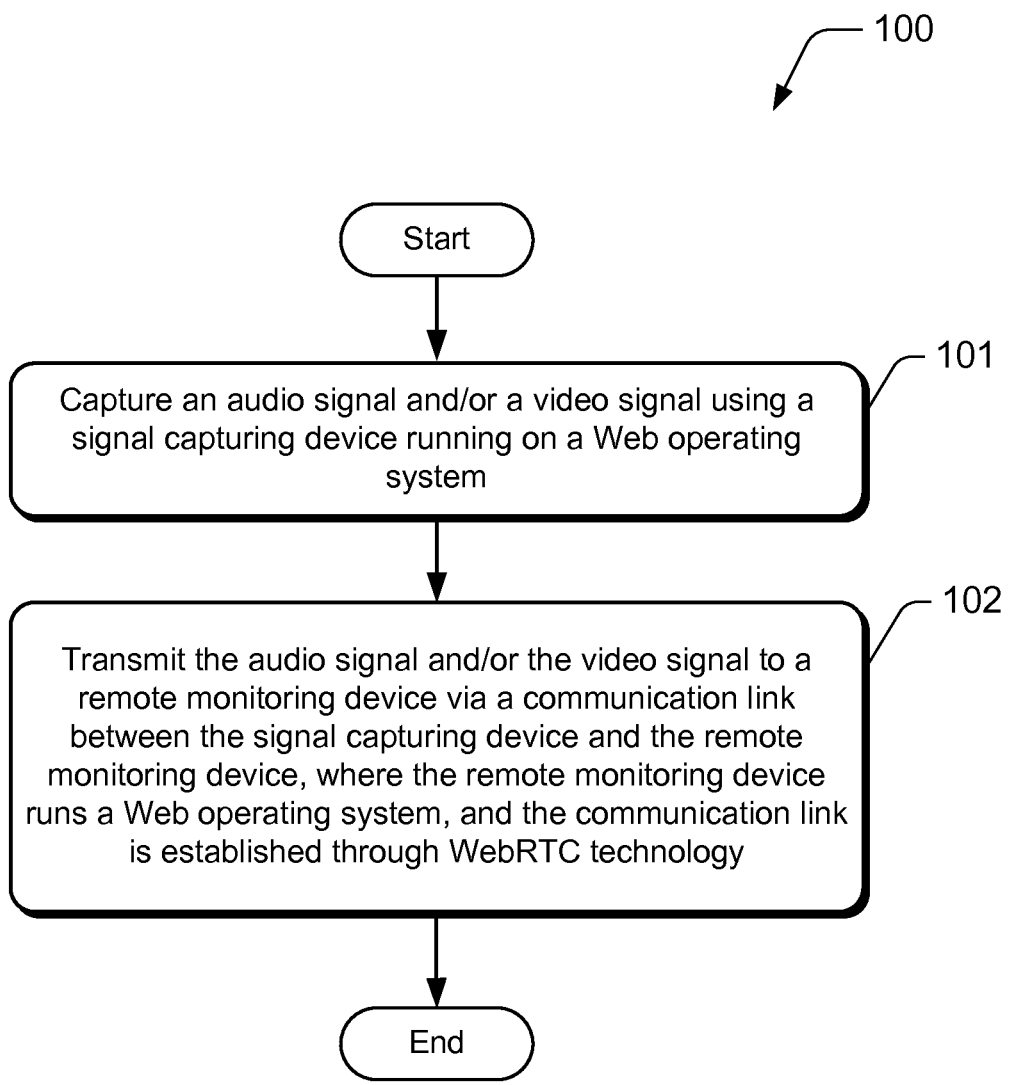
FIG. 1 is a block flow diagram of an example process at signal capturing end in accordance with a disclosed method for remote monitoring.

The present disclosure is described in further detail in conjunction with accompanying figures and example embodiments. In the description, the term "technique(s)," for instance, may refer to a method, an apparatus device, a system, and/or computer-readable instructions as permitted by the context above and throughout the present disclosure.

In this description, the order in which a process is described is not intended to be construed as a limitation, and any number of the described process blocks may be combined in any order to implement the method, or an alternate method. An embodiment is described in sequential steps only for the convenience of illustration. Unless it would cause a conflict, the examples and embodiments described in the present disclosure, and the characteristics and features thereof, may be combined freely. Further, not every step described in the embodiments is required in order to practice the techniques of this disclosure.

The main idea of the present disclosure is to use a Web operating system-based signal capturing device and a Web operating system-based remote monitoring device to perform remote monitoring, utilizing a communication link between the two devices using WebRTC technology. The audio signal and/or video signal captured by the signal capturing device is transmitted through the WebRTC link to the remote monitoring device, which processes the received audio signal and/or video signal in order to perform remote monitoring. This design has the benefits of lower-cost and easier product development and deployment.

For the convenience of description, the terms used in this disclosure are defined as follows.

WebApp: an application developed using web technology such as JavaScript, CSS and HTML.

WebRTC: Web Real-Time Communication, an API definition that supports browser-to-browser applications for real time voice and video communications and P2P file sharing without the need of either internal or external plugins. WebRTC is an HTML5 API for real time data transfer, which includes three functions: (1) accessing audio and video devices, such as a microphone and a video camera; (2) establishing a peer to peer network communication link; and (3) making two-way data transfers.

Web operating system: an operating system that primarily carries and runs WebApps, most commonly used on mobile devices. Most mobile devices with a Web operating system already have an audio device and video device, and by default support the WebRTC of HTML 5 when the Web operating system is running.

HTML5: the standard of a new generation web platform, which is a core technology markup language of the Internet used for structuring and presenting content for the World Wide Web. HTML5 introduces more optimized choices of web functions to developers, and has advantages in user experiences. HTML5 provides open interfaces for data and application access to enable external applications to be directly connected to the data inside the browser. For example, with HTML5, video and audio can be directly connected to a microphone and a video camera.

FIG. 1 is a block flow diagram of an example process 100 at signal capturing end in accordance with a disclosed method for remote monitoring.

At block 101, a signal capturing device running a Web operating system captures an audio signal and/or a video signal. Most signal capturing devices running a Web operating system have an operating environment that supports the WebRTC technology of HTML5 by default. Therefore, an application program can access the audio device and/or the video device of the signal capturing device through the MediaStream interface of WebRTC to capture an audio signal and/or a video signal. Preferably, the audio device is a microphone, and the video device is a video camera.

At block 102, the signal capturing device transmits the audio signal and/or the video signal to a remote monitoring device via a communication link between the signal capturing device and the remote monitoring device. The remote monitoring device supports the Web operating system to allow the communication link to be established using WebRTC technology. In one embodiment, the remote monitoring device also runs a Web operating system (which may or may not be the same Web operating system on the signal capturing device).

More specifically, if the signal capturing device and the remote monitoring device belong to the same local area network, a peer to peer connection may be established between the two devices using the RTCPeerConnection of WebRTC as the communication link between the two devices. If the signal capturing device and the remote monitoring device belong to different local area networks, one of the devices may expose its IP address to the other device to allow a peer to peer connection to be established between the two devices using the RTCPeerConnection of WebRTC.

For example, in one embodiment, upon establishing a communication link between the signal capturing device and the remote monitoring device, the audio signal and/or the video signal is transmitted to the remote control device through the RTCDataChannel of WebRTC to allow a user at the remote monitoring device to perform remote monitoring.

Described above is an exemplary embodiment of a remote monitoring method implemented at signal capturing end, where the signal capturing device running a Web operating system utilizes its WebRTC technology to capture audio signals and/or video signals, and transmits the collected signals to the remote monitoring device (which also supports a Web operating system) through the communication link established between the two devices, to allow the remote monitoring device to perform remote monitoring. Compared to the existing techniques, the disclosed method lowers the threshold of application devices for remote monitoring, and does not requires purchasing of special audio and/or video signal capturing devices, which is a common cause of high costs and high level of product development difficulties.

Figure 2:
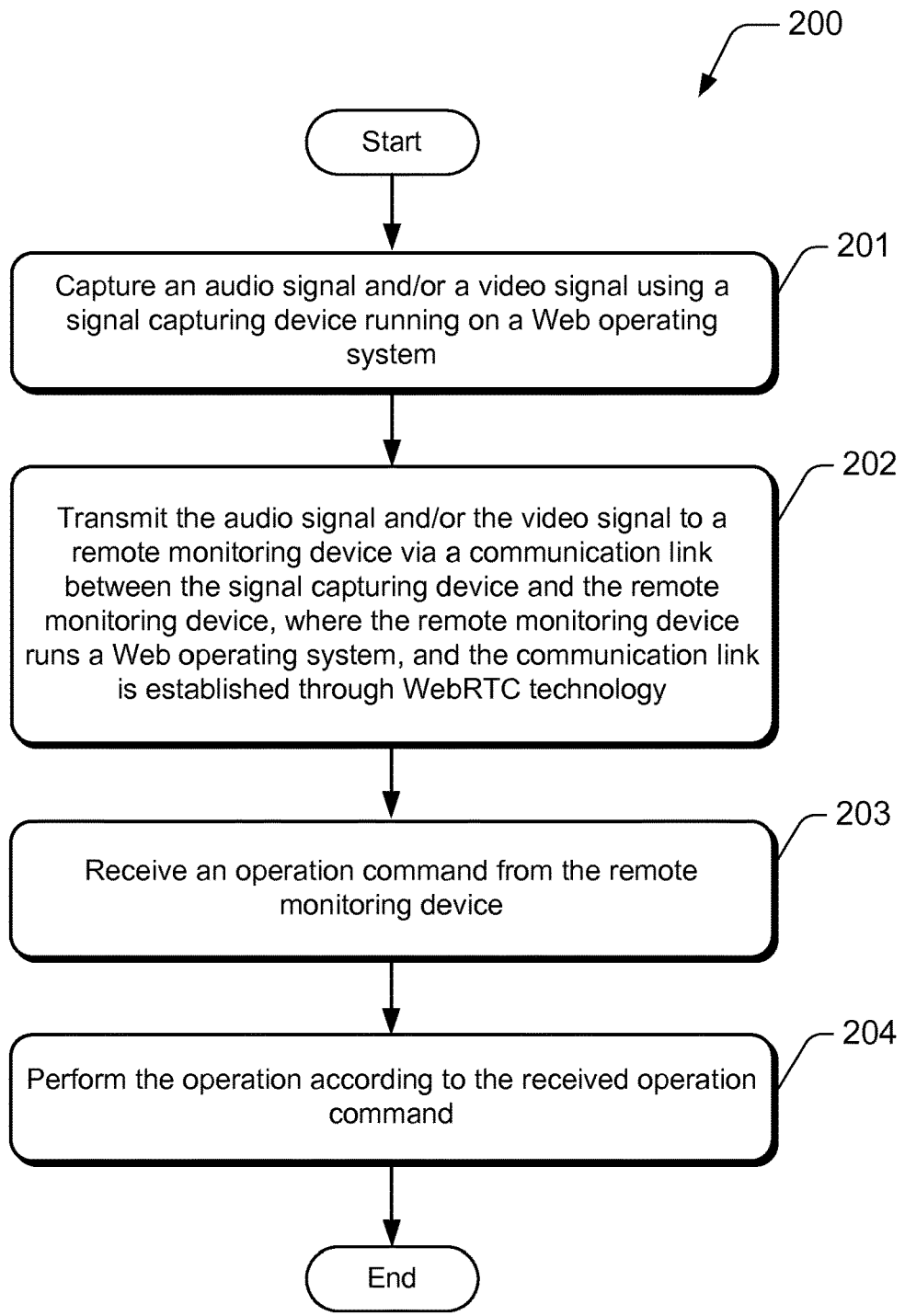
FIG. 2 is a block flow diagram of an example process at signal capturing end in accordance with a disclosed method for remote monitoring.

FIG. 2 is a block flow diagram of an example process 200 at signal capturing end in accordance with a disclosed method for remote monitoring.

Blocks 201 and 202 are identical to blocks 101 and 102, and are not described again.

At block 203, the signal capturing device receives an operation command from a remote monitoring device.

More specifically, upon processing the audio signal and/or video signal received from the signal capturing device, the remote monitoring device generates the feedback based on the result of the processing of the signal. The feedback allows a user to determine whether and what operation is to be performed on the signal capturing device. Because a communication link has already been established between the signal capturing device and the remote monitoring device, and both devices support a Web operating system, the user may send an operation command from the remote monitoring device to the signal capturing device through the communication link using the Web operating system(s). For example, an operating command may be sent to adjust an angle of the video camera or the volume level of the microphone.

At block 204, an operation is performed on the signal capturing device, according to the operation command received. The operation may be performed using an application program running on the signal capturing device.

Upon receiving the operation command from the remote monitoring device, the signal capturing device performs the corresponding operation. For example, the operation may be adjusting an angle of the camera or adjusting the volume level of the microphone. The remote operation allows the user to remotely control the signal capturing device.

Described above is another exemplary embodiment of a remote monitoring method implemented at signal capturing end, where the signal capturing device running a Web operating system utilizes its WebRTC technology to receive an operation command from the remote monitoring device (which also supports a Web operating system) through the communication link established between the two devices, and to perform an operation according to the received operation command. Compared to the process 100 of FIG. 1, process 200 of FIG. 2 improves remote monitoring by allowing further control and operation of the signal capturing device after the remote monitoring device has received and processed the captured signal from the signal capturing device.

Figure 3:
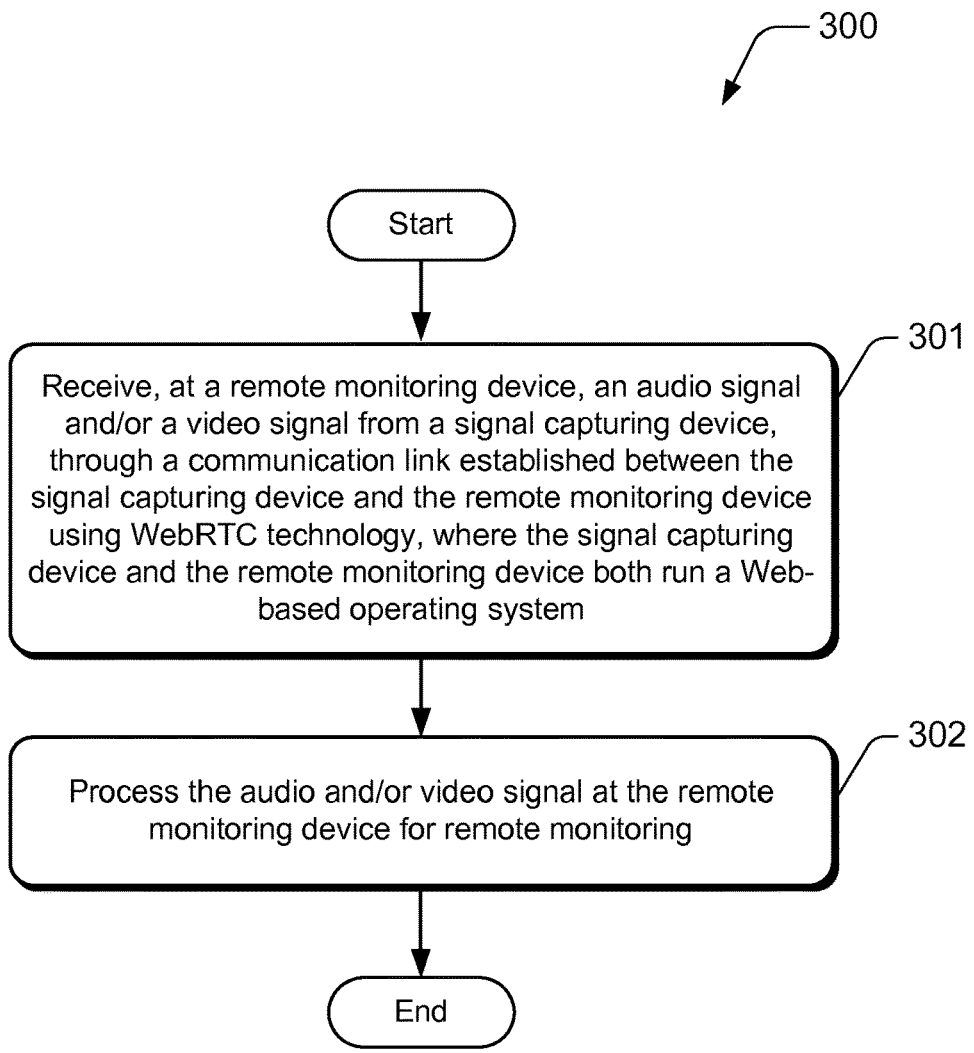
FIG. 3 is a block flow diagram of an example process at remote monitoring end in accordance with a disclosed method for remote monitoring.

FIG. 3 is a block flow diagram of an example process 300 at remote monitoring end in accordance with a disclosed method for remote monitoring.

At block 301, a remote monitoring device receives an audio signal and/or a video signal from a signal capturing device, through a communication link established between the signal capturing device and the remote monitoring device using WebRTC technology. The signal capturing device and the remote monitoring device both support a Web operating system to allow the communication link to be established between the signal capturing device and the remote monitoring device using WebRTC technology.

In practice, if the signal capturing device and the remote monitoring device belong to the same local area network, a peer to peer connection may be established between the two devices using the RTCPeerConnection of WebRTC as the communication link between the two devices. If the signal capturing device and the remote monitoring device belong to different local area networks, one of the devices may expose its IP address to the other device to allow a peer to peer connection to be established between the two devices using the RTCPeerConnection interface of WebRTC. Once the communication link is established between the signal capturing device and the remote monitoring device, the signal capturing device may transmit the captured audio signal and/or video signal to the remote monitoring device through the RTCPeerConnection interface of WebRTC, and the remote monitoring device may receive the transmitted signal.

At block 302, the remote monitoring device processes the audio and/or video signal for remote monitoring.

In one embodiment, the remote monitoring device may use an HTML5-based application program to directly process the received audio signal and/or video signal for remote monitoring.

Because the remote monitoring device supports a Web operating system, HTML5-based applications (such as a browser or a webpage) running on the remote monitoring device are capable of executing web codes in real time. Therefore, for different monitoring scenarios, different web codes can be loaded in order to meet the needs of different monitoring treatments, without requiring special hardware. For example, for home security application scenarios, one can define a specific real-time comparison of different moments in the loaded web codes of video data, so that as the signal capturing device at the entrance of the house transmits the audio signals and/or video signals to the remote monitoring device, a showing of large differences in the comparison results may be used as a condition to set off an alarm.

Above-described is an exemplary embodiment of a remote monitoring method implemented at the remote monitoring end, where the remote monitoring device receives from the signal capturing device captured audio signals and/or video signals. Both devices support a Web operating system which utilizes WebRTC technology to capture, transmit and receive audio signals and/or video signals through the communication link established between the two devices, to allow the remote monitoring device to perform remote monitoring. Compared to the existing techniques, the disclosed method lowers the threshold of application devices for remote monitoring, and no longer requires purchasing of special audio and/or video signal capturing devices, which is a common cause of high costs and the high level of product development requirements.

Figure 4:
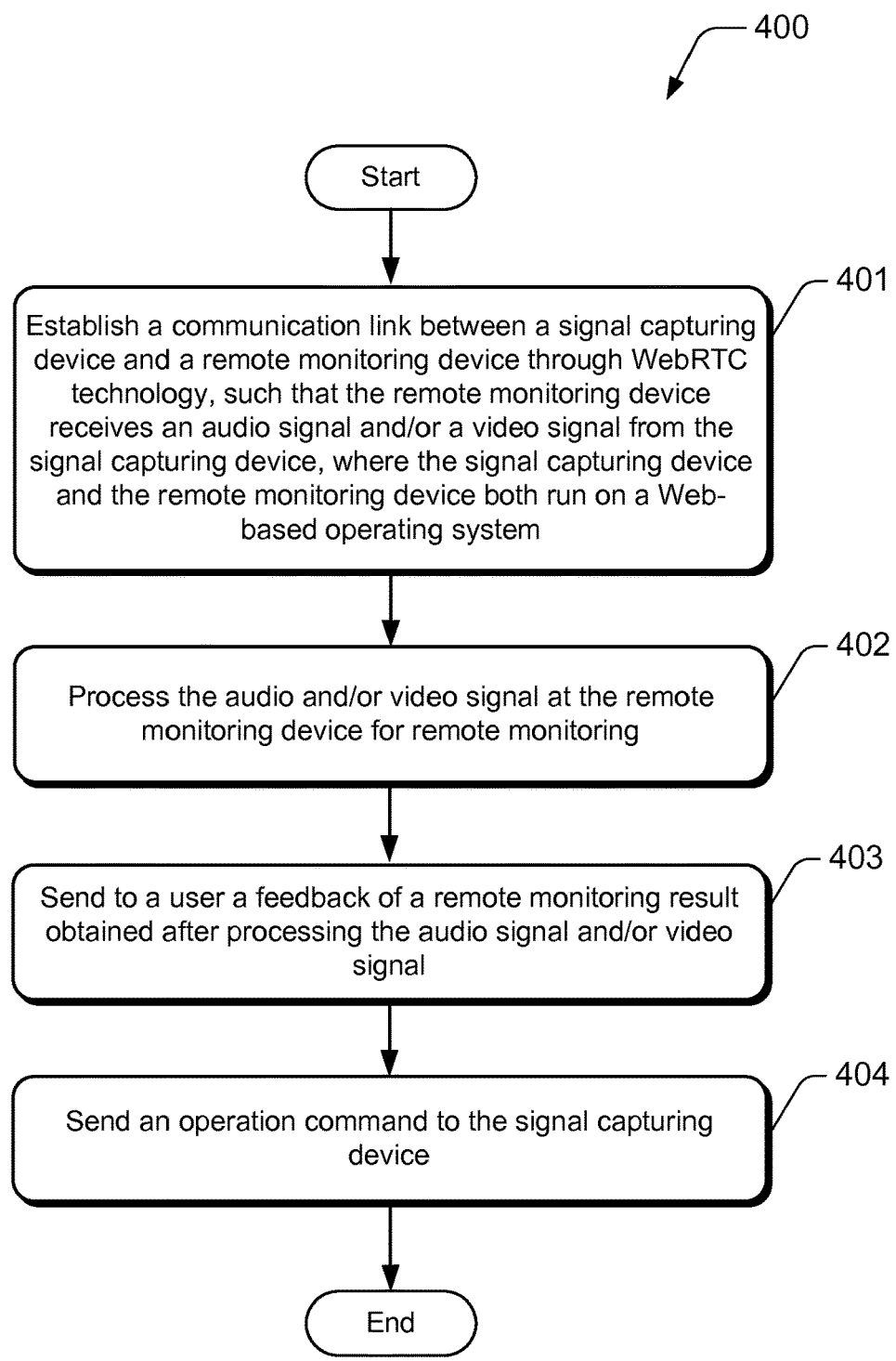
FIG. 4 is a block flow diagram of an example process at remote monitoring end in accordance with a disclosed method for remote monitoring.

FIG. 4 is a block flow diagram of an example process 400 at remote monitoring end in accordance with a disclosed method for remote monitoring. Blocks 401 and 402 are identical to blocks 301 and 302 of FIG. 3, and are not repeated.

At block 403, upon processing the received audio signal and/or video signal, the remote monitoring device sends a feedback based on a result of signal processing to the signal capturing device.

The audio signal and/or video signal is received at the preceding block 402. Using the audio/video output capability of the remote monitoring device, a web browser running on the remote monitoring device can be used to send the feedback to a user using a variety of suitable ways, including a sound and a screen display. For example, a monitoring result can be sent to the user in the form of a text message or an email. In one embodiment, a web browser may be used to display the monitoring result.

At block 404, the remote monitoring device sends an operation command to the signal capturing device.

More specifically, upon receiving from the remote monitoring device a feedback based on the result of the processing of the signal, the user may determine whether and what operation is to be performed on the signal capturing device. Because a communication link has already been established between the signal capturing device and the remote monitoring device, and both devices support a Web operating system, the user may send an operation command from the remote monitoring device to the signal capturing device through the communication link supported by the Web operating system(s). For example, an operating command may be sent to adjust an angle of the video camera or the volume level of the microphone.

The above-described is another exemplary process 400 of a remote monitoring method implemented at the remote monitoring end, where the remote monitoring device processes the audio signals and/or video signals received from the signal capturing device, and sends a processing result to the user as a feedback to the user. Because both devices support a Web operating system, the remote monitoring device may utilize WebRTC technology to send an operation command through the communication link established between the two devices, to the signal capturing device. Compared to the exemplary process 300 of FIG. 3, the process 400 of FIG. 4 further improves remote monitoring by allowing additional controls and operations of the signal capturing device after the remote monitoring device has received and processed the captured signal from the signal capturing device.

In connection to the method disclosed herein, the present disclosure also provides a computer-based apparatus for implementing the method described herein.

The above-described techniques may be implemented with the help of one or more non-transitory computer-readable media containing computer-executable instructions. The non-transitory computer-executable instructions enable a computer processor to perform actions in accordance with the techniques described herein. It is appreciated that the computer readable media may be any of the suitable memory devices for storing computer data. Such memory devices include, but not limited to, hard disks, flash memory devices, optical data storages, and floppy disks. Furthermore, the computer readable media containing the computer-executable instructions may consist of component(s) in a local system or components distributed over a network of multiple remote systems. The data of the computer-executable instructions may either be delivered in a tangible physical memory device or transmitted electronically.

In the presence disclosure, a "module" in general refers to a functionality designed to perform a particular task or function. A module can be a piece of hardware, software, a plan or scheme, or a combination thereof, for effectuating a purpose associated with the particular task or function. In addition, delineation of separate modules does not necessarily suggest that physically separate devices are used. Instead, the delineation may be only functional, and the functions of several modules may be performed by a single combined device or component. When used in a computer-based system, regular computer components such as a processor, a storage and memory may be programmed to function as one or more modules to perform the various respective functions.

Figure 5:
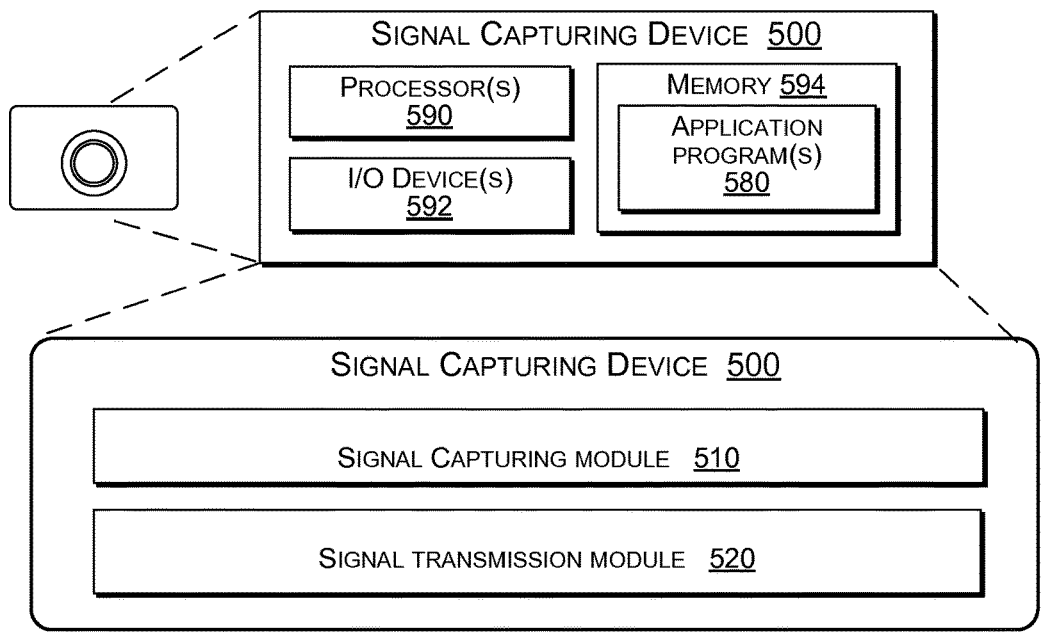
FIG. 5 is a schematic diagram of the function blocks of an example signal capturing device in accordance with the present disclosure.

FIG. 5 is a schematic diagram of the function blocks of an example signal capturing device 500 in accordance with the present disclosure.

Signal capturing device 500 can be based on a typical computing device hardware which has one or more processor(s) 590, I/O devices 592, and memory 594 which stores application program(s) 580. The computing device of signal capturing device 500 runs a Web operating system, and is programmed to have the following functional modules.

A signal capturing module 510 is programmed for capturing an audio signal and/or a video signal; and a signal transmission module 520 is programmed for transmitting the audio signal and/or the video signal to a remote monitoring device via a communication link between the signal capturing module and the remote monitoring device. The remote monitoring device also supports a Web operating system such that the communication link can be established using WebRTC technology.

In one embodiment, the computing device of the signal capturing device 500 is further programmed to include an operation command receiving module for receiving an operation command from the remote monitoring device; and an operation execution module for executing the operation according to the operation command.

The signal capturing module 510 may include an access module (not shown separately) for accessing an audio unit or a video unit of the signal capturing module 510 through a MediaStream port. Preferably, the audio unit has a microphone, and the video unit has a video camera.

The signal transmission module 520 may include a connection module for establishing a peer to peer connection with the remote monitoring device through an RTCPeerConnection interface.

For example, the signal transmission module 520 may have an RTCDataChannel interface and be programmed for transmitting the audio signal and/or the video signal to the remote monitoring device through the RTCDataChannel interface.

The above embodiments of the signal capturing device 500 are closely related to the embodiments of the method described in FIGS. 1 and 2, and therefore the detailed description of the embodiments of the method is also applicable to the embodiments of the apparatus and is not repeated.

As described herein, the signal capturing device 500 runs a Web operating system to utilize its WebRTC technology to capture audio signals and/or video signals, and transmits the collected signals to the remote monitoring device (which also runs a Web operating system) through the communication link established between the two devices, to allow the remote monitoring device to perform remote monitoring. Compared to the existing techniques, the disclosed signal capturing device 500 lowers the threshold of application devices for remote monitoring, and no longer requires purchasing of special audio and/or video signal capturing devices, which is a common cause of high costs and high level of product development requirements.

Figure 6:
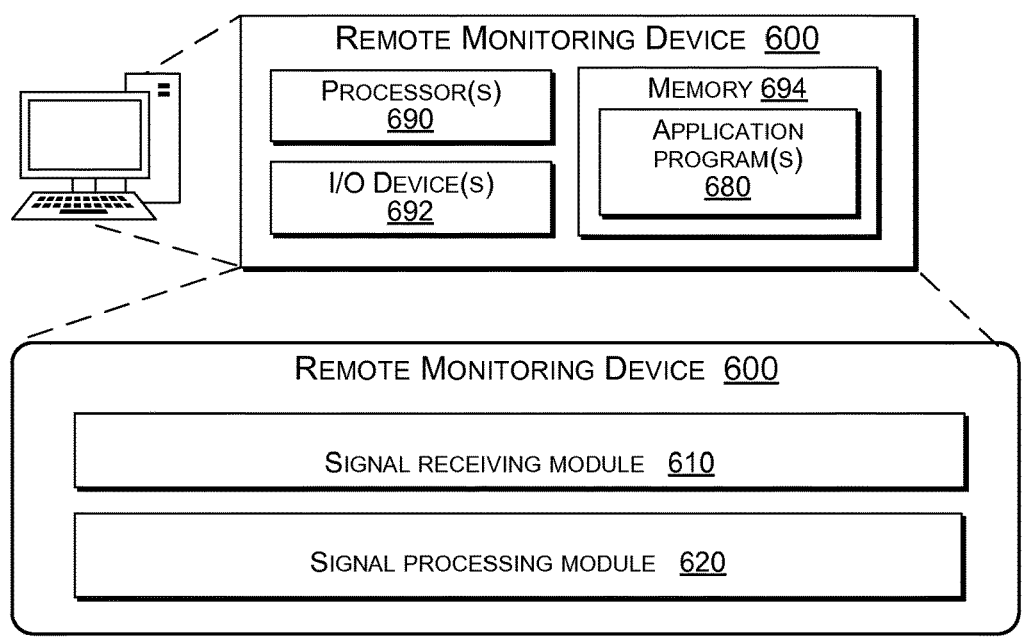
FIG. 6 is a schematic diagram of the function blocks of an example remote monitoring device in accordance with the present disclosure.

FIG. 6 is a schematic diagram of the function blocks of an example remote monitoring device 600 in accordance with the present disclosure.

Remote monitoring device 600 can be based on a typical computing device hardware which has one or more processor(s) 690, I/O devices 692, and memory 694 which stores application program(s) 680. The computing device of remote monitoring device 600 runs a Web operating system, and is programmed to have the following functional modules.

A signal receiving module 610 is programmed for receiving an audio signal and/or a video signal through a WebRTC communication link between a signal capturing device and the signal receiving module; and a signal processing module 620 is programmed for processing the audio and/or video signal for remote monitoring.

In one embodiment, the remote monitoring device 600 have a feedback module (not shown separately) which is programmed to send to a user a feedback of a remote monitoring result obtained after processing the audio signal and/or video signal. The feedback module may also be programmed to send a feedback of the remote monitoring result to the user as a text message or email. The feedback module may also be programmed to have a monitoring result display submodule (not shown separately) for displaying the feedback in a web browser.

In one embodiment, the remote monitoring device 600 is programmed to send an operation command to the signal capturing device.

The above embodiments of the remote monitoring device 600 are closely related to the embodiments of the method described in FIGS. 3 and 4, and therefore the detailed description of the embodiments of the method is also applicable to the embodiments of the apparatus and is not repeated.

As described above, the remote monitoring device 600 processes the audio signals and/or video signals received from the signal capturing device 500, and feeds back a processing result to the user. Because both devices support a Web operating system, the remote monitoring device 600 may utilize WebRTC technology to send an operation command to the signal capturing device through the communication link established between the two devices. The received signals may be processed using Web apps that support HTML5 for remote monitoring. Compared to the existing technologies, the remote monitoring device 600 lowers the threshold of application devices for remote monitoring, and does not requires purchasing of special audio and/or video signal capturing devices.

Figure 7:
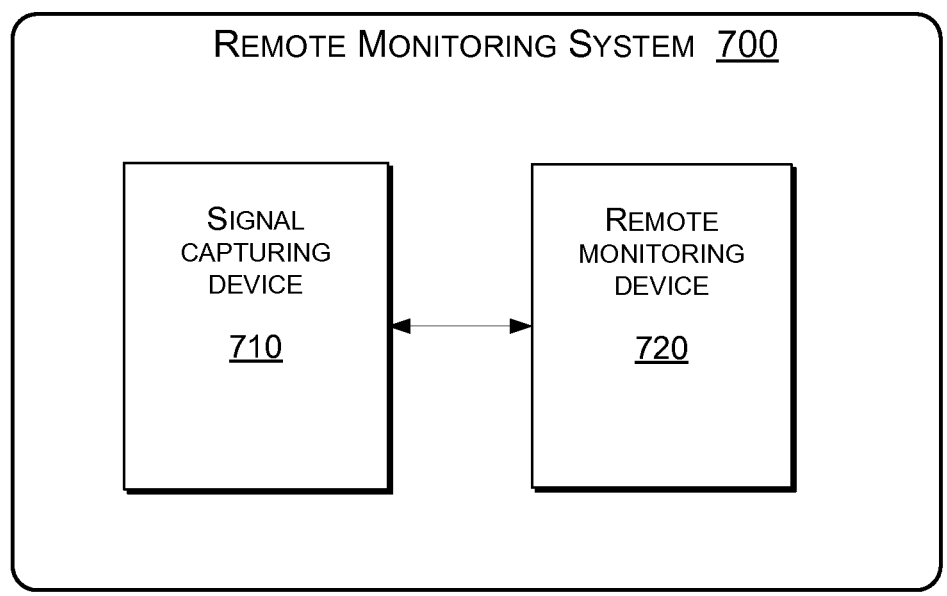
FIG. 7 is a schematic diagram of the function blocks of an example remote monitoring system in accordance with the present disclosure.

FIG. 7 is a schematic diagram of the function blocks of an example remote monitoring system 700 in accordance with the present disclosure.

Remote monitoring system 700 include signal capturing device 710 (which can be the same as signal capturing device 500 of FIG. 5) and remote monitoring device 720 (which can be the same as the remote monitoring device 600 of FIG. 6). The signal capturing device 710 is based on a Web operating system, and used for capturing audio signals and/or video signals, and transmitting the captured signals to the remote monitoring device 720 through a WebRTC communication link established between the two devices be processed. Remote monitoring device 720 also supports a Web operating system, and is used for receiving the audio signals and/or video signals, and processing the received signals for remote monitoring.

The remote monitoring system 700 can be configured using any existing audio/video device capable of supporting or running a Web operating system which supports WebRTC to allow the remote monitoring function as described herein. The remote monitoring system 700 therefore does not require separate purchase of special devices for capturing, transmitting, receiving and processing audio and/or video signals, and thus avoids the high costs and high level product development requirements.

The technique described in the present disclosure may be implemented in a general computing equipment or environment or a specialized computing equipment or environment, including but not limited to personal computers, server computers, hand-held devices or portable devices, tablet devices, multiprocessor systems, microprocessor-based systems, set-top boxes, programmable consumer devices, network PCs, microcomputers and large-scale mainframe computers, or any distributed environment including one or more of the above examples.

In a typical configuration, a computing device includes one or more processors (CPU), input/output interfaces, network interfaces, and memory.

The memory may include a computer-readable medium such as a volatile memory, random access memory (RAM) and/or other forms of nonvolatile memory, such as read only memory (ROM) or flash memory (flash RAM). The internal memory of a computing device is a type of computer-readable memory medium.

The computer-readable media include permanent and non-permanent, removable and non-removable media, and may be formed in any method or technology for storage of information. Information stored may be a set of computer-readable instructions, data structures, program modules or other data. Examples of the computer storage media include, but are not limited to, phase-change memory (PRAM), a static random access memory (SRAM), dynamic random access memory (DRAM), other types of random access memory (RAM), read-only memory (ROM), electrically erasable programmable read-only memory (EEPROM), flash memory or other memory technology, CD-ROM read-only memory (CD-ROM), digital versatile disc (DVD) or other optical storages, magnetic cassettes, magnetic tape disk storage or other magnetic storage devices, or any other non-transmission medium that may be used to store information accessible by a computing device. According to definitions of the present disclosure, computer-readable media do not include temporary computer readable media (transitory media), such as a modulated data signal and a carrier wave.

The modules in particular may be implemented using computer program modules based on machine executable commands and codes. Generally, a computer program module may perform particular tasks or implement particular abstract data types of routines, programs, objects, components, data structures, and so on. Techniques described in the present disclosure can also be practiced in distributed computing environments, such a distributed computing environment, to perform the tasks by remote processing devices connected through a communication network. In a distributed computing environment, program modules may be located in either local or remote computer storage media including memory devices.

Various embodiments of the present specification are described progressively increased details with examples and environments. Each embodiment may focus a certain aspect of the disclosure, and therefore different embodiments may differ from one another, but may also share similar parts.

Exemplary embodiments are employed to illustrate the concept and implementation of the present invention in this disclosure. The exemplary embodiments are only used for better understanding of the method and the core concepts of the present disclosure. Based on the concepts in this disclosure, one of ordinary skills in the art may modify the exemplary embodiments and application fields.

What is claimed is:

1. A method implemented by a remote monitoring device, the method comprising:
   receiving video signals of different times captured by a video camera from a signal capturing device through a communication link established between the signal capturing device and the remote monitoring device using WebRTC technology, wherein the signal capturing device and the remote monitoring device both run a Web operating system;
   processing the video signals of the different times at the remote monitoring device for remote monitoring;
   loading web codes of video data;
   defining a specific real-time comparison of different moments in the loaded web codes of video data; and
   using a specific difference in a result of the specific real-time comparison as a condition to set off a particular device.

2. The method according to claim 1, further comprising sending to a user a feedback of a remote monitoring result obtained after processing the video signals.

3. The method according to claim 2, wherein sending to the user the feedback of the remote monitoring result comprises sending a text message or an email to the user.

4. The method according to claim 2, wherein the feedback of the remote monitoring result is displayed in a web browser.

5. The method according to claim 1, further comprising: sending from the remote monitoring device an operation command to the signal capturing device.

6. A remote monitoring system, the system comprising a computing device having one or more processors and memory, wherein the computing device runs a Web operating system and is programmed to have functional modules including:
   a signal receiving module for receiving video signals of different times captured by a video camera of a signal capturing device through a WebRTC communication link between the signal capturing device and the signal receiving module; and
   a signal processing module for:
     processing the video signals of the different times for remote monitoring,
     loading web codes of video data,
     defining a specific real-time comparison of different moments in the loaded web codes of video data, and
     using a specific difference in a comparison result as a condition to set off a particular device.

7. The system according to claim 6, wherein the computing device is programmed to send to a user a feedback of a remote monitoring result obtained after processing the video signals.

8. The system according to claim 7, wherein the feedback of the remote monitoring result is displayed in a web browser.

9. The system according to claim 6, wherein the computing device is programmed to send an operation command to the signal capturing device.

* * * * *